Jan. 17, 1939.  O. M. JENSEN ET AL  2,144,335

FLUID PRESSURE WORK FEED

Filed March 6, 1937  4 Sheets-Sheet 1

INVENTORS
OTTO M. JENSEN
THOMAS WHITLEY
FRANK T. WRUK

BY

ATTORNEYS

Jan. 17, 1939. O. M. JENSEN ET AL 2,144,335
FLUID PRESSURE WORK FEED
Filed March 6, 1937 4 Sheets-Sheet 2

INVENTORS
OTTO M. JENSEN
THOMAS WHITLEY
FRANK T. WRUK
BY
ATTORNEYS

Jan. 17, 1939.  O. M. JENSEN ET AL  2,144,335
FLUID PRESSURE WORK FEED
Filed March 6, 1937   4 Sheets-Sheet 3

INVENTORS
OTTO M. JENSEN
THOMAS WHITLEY
FRANK T. WRUK

BY

ATTORNEYS

Jan. 17, 1939.  O. M. JENSEN ET AL  2,144,335
FLUID PRESSURE WORK FEED
Filed March 6, 1937  4 Sheets-Sheet 4

INVENTORS
OTTO M. JENSEN
THOMAS WHITLEY
FRANK T. WRUK

BY

ATTORNEYS

Patented Jan. 17, 1939

2,144,335

UNITED STATES PATENT OFFICE 2,144,335

FLUID PRESSURE WORK FEED

Otto M. Jensen, Thomas Whitley, and Frank T. Wruk, Racine, Wis., assignors to Peerless Machine Company, Racine, Wis.

Application March 6, 1937, Serial No. 129,392

4 Claims. (Cl. 29—73)

This invention pertains to a fluid pressure work feed, and more particularly to an automatic apparatus for use in connection with machine tools, such as hacksaws, punch and drill presses, reamers, welding machines, and the like, in which a piece of stock must be fed to the tool or working element for successive operations upon the stock.

The invention has primarily for its object the provision of an automatic, positive, and accurate work feed of the foregoing character, which is comparatively simple, sturdy, and inexpensive in design, there being a minimum number of working parts capable of operation at exceedingly low pressures.

Incidental to the foregoing, a more specific object of the invention resides in the provision of an automatic work feed comprising a hydraulicly actuated feeding, chucking, and gauging elements, all controlled by a single valve, the actuation of which is controlled by the machine, and the work.

Another object resides in the provision of a highly novel type of gauge for positively and accurately determining the length of feed of the stock.

A still further object resides in the provision of means for initiating operation of the machine tool upon completion of the various operations comprising the feeding cycle, including releasing of the stock, feeding the same, gauging the length of feed, and again clamping the stock.

With the above and other objects in view, which will appear as the description proceeds, the invention resides in the novel construction, combination, and arrangement of parts, substantially as hereinafter described, and more particularly defined by the appended claims, it being understood that such changes in the precise embodiment of the herein disclosed invention may be made as come within the scope of the claims.

In the accompanying drawings is illustrated one complete example of the physical embodiment of the present invention constructed according to the best mode so far devised for the practical application of the principles thereof.

Figure 6:
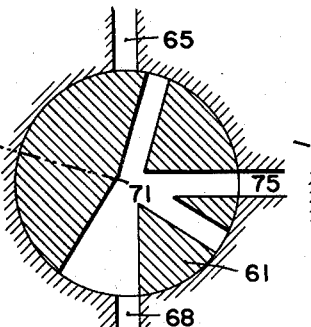
Figure 7:
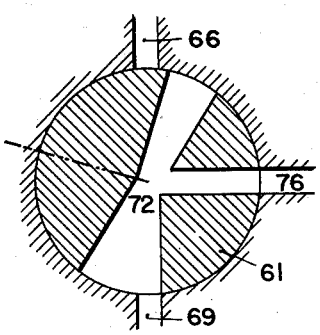
Figure 6A:
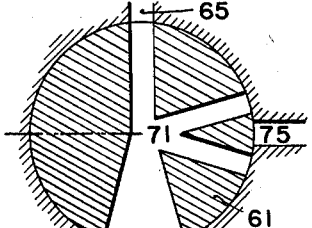
Figure 7A:
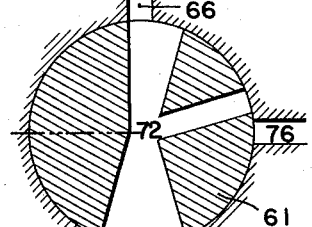
Figure 6B:
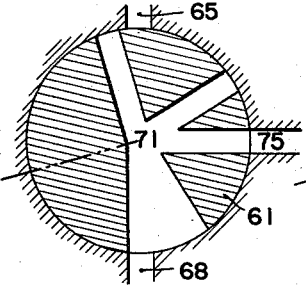
Figure 7B:
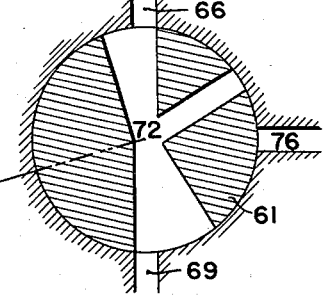
Figure 4:
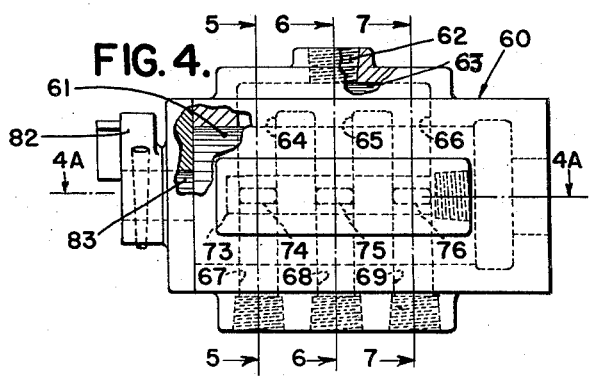
Figure 4 is an elevation of the fluid pressure control valve, parts being broken away and in section.

Figures 6, 6A, and 6B are similar views taken on the line 6—6 of Figure 4, through a second set of ports, while Figures 7, 7A, and 7B are taken on the line 7—7 of Figure 4 through a third set of ports.

Figure 1:
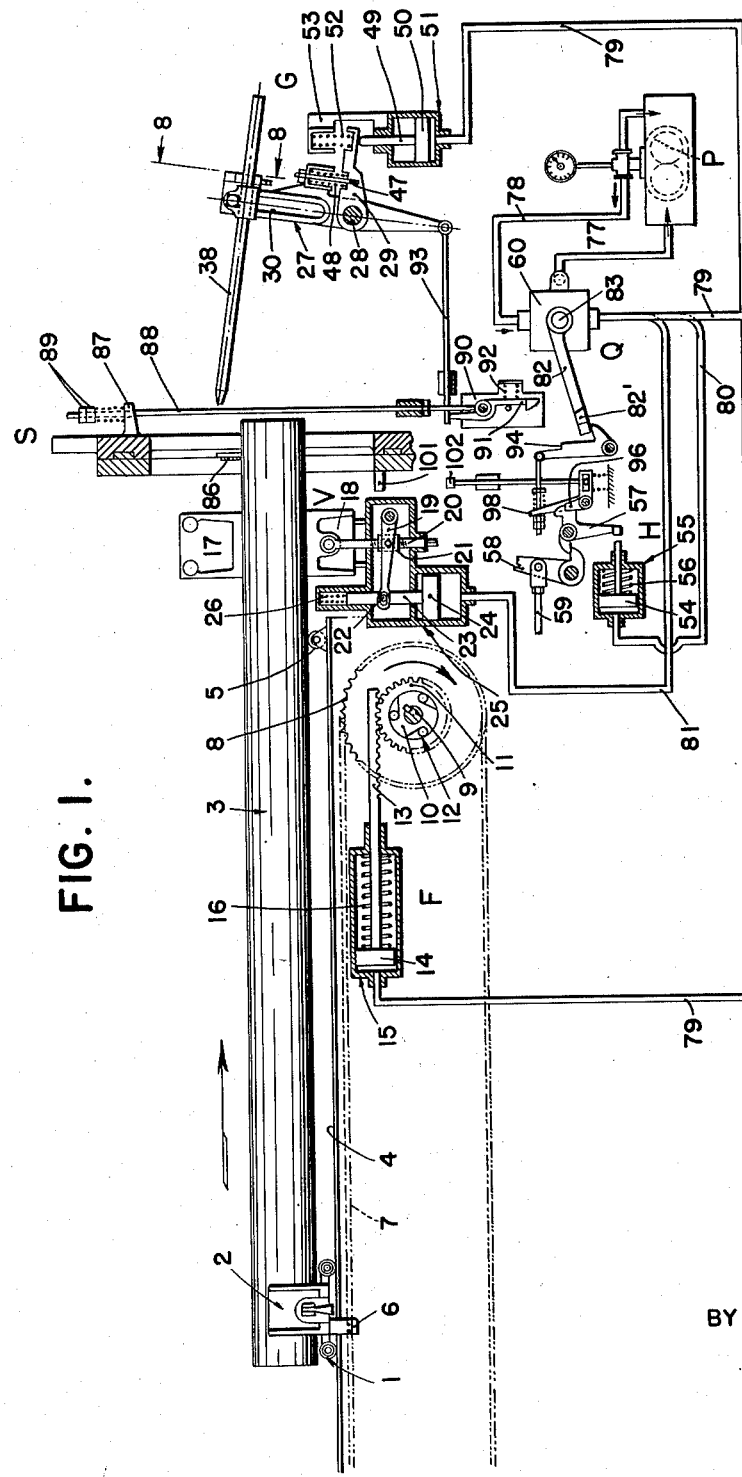
Figure 1 is a schematic illustration of an apparatus constructed in accordance with one form of the present invention, as applied to a conventional power hacksaw, parts being broken away and in section to more clearly illustrate structural details.
Figure 8:
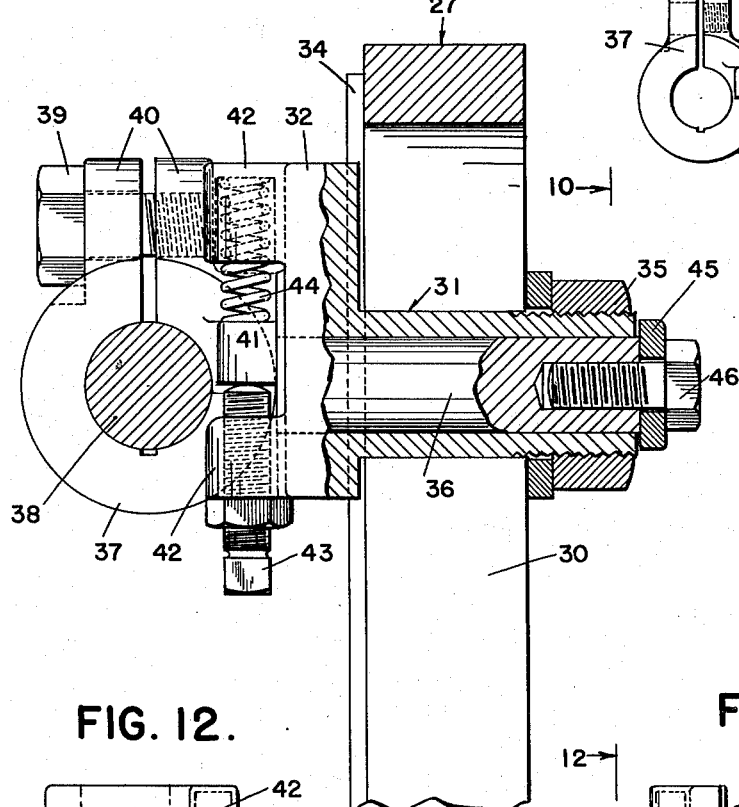

Figure 8 is an enlarged fragmentary detail section of the feed gauge, taken on the line 8—8 of Figure 1.

Figure 9:
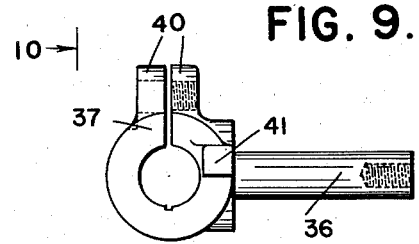
Figure 10:
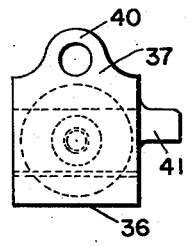

Figures 9 and 10 are detail elevations of the gauge finger mounting, and

Figure 12:
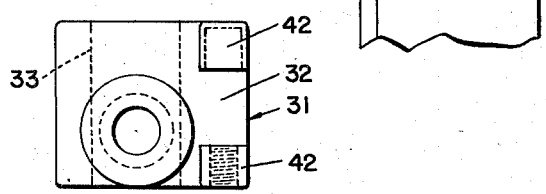
Figure 11:
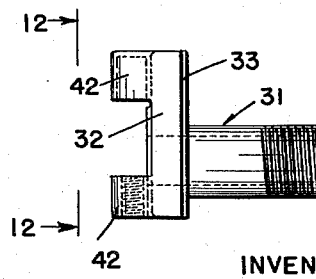
Figure 4A:
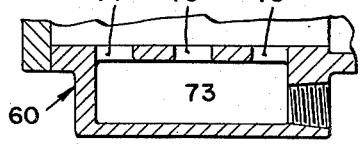
Figure 4A is a fragmentary longitudinal section through the fluid return ports in the valve casing, taken on the line 4A—4A of Figure 4.

Figures 11 and 12 are similar views of the adjustable bracket which carries the finger mounting.

For the purpose of explanation, the present invention has been illustrated as applied to a conventional power hacksaw, the head and saw frame of which are designated generally by the letter S. However, as set forth in the objects of the invention, it is to be understood that the invention has broad application, and may be utilized in connection with any type of machine to which it is desired to feed a relatively long piece of stock for successive operations by the machine. Therefore, the invention is not to be limited, other than as specified in the appended claims.

Referring now more particularly to the accompanying drawings, the apparatus constituting the present invention comprises generally a feed mechanism F, a chucking device V, a gauge mechanism G, a starting mechanism H, a fluid pump P, and a control valve Q, all of which function in cooperation with one another to effect a complete feeding cycle after each operation of the machine to which the apparatus is applied.

Feed mechanism

The feed mechanism F comprises in detail a carriage designated by the numeral 1, and upon which a conventional vise 2 is mounted for clamping the stock 3 to be intermittently fed to the machine tool S. The carriage 1 is provided with rollers that travel upon a suitable track 4, which also carries a roller 5 for supporting the forward end of the stock adjacent the machine tool.

The carriage 1 is provided with a depending lug 6 attached to a conveyor chain 7, which passes over a feed sprocket 8 mounted upon the shaft 9, and provided with a hub 10 that carries a loose pinion 11 adapted to clutch the hub 10 upon rotation in the direction indicated by the arrow, to intermittently feed the upper stretch of the conveyor chain 7 forwardly, a conventional roller clutch 12 being employed which permits reverse rotation of the pinion 11 without effect upon the sprocket 8. The pinion 11 is oscillated by a rack 13 connected to a piston 14 mounted within a fluid cylinder 15. The working stroke of the piston 14 is effected by fluid pressure from the pump P, while a spring 16, mounted within the cylinder, serves to return the piston to its normal position.

Clamping mechanism

The clamping device V, which holds the forward end of the stock 3 during operation of the machine tool, comprises a stationary jaw 17, and a reciprocating jaw 18 connected to a pivotal lever 19 by a rod 20 threaded into a block 21, which in turn is pivotally connected to the lever 19. The outer end of the lever 19 is slotted for the reception of a pin 22, carried by the stem 23, connected to a piston 24, which operates in the fluid cylinder 25, also supplied with the pressure fluid from the pump P. A spring 26 serves to urge the plunger 24 to its normal position, in which the jaw 18 is withdrawn from the stock to release the same, and allow it to be fed forwardly by the carriage 1 after the machine tool has performed its operation.

Gauging mechanism

The gauging mechanism G consists of a lever 27 mounted upon the shaft 28, which also carries an arm 29. The upper end of the lever 27 is provided with a slot 30 for reception of the hollow shank 31, which is provided with an elongated head 32, having a rib 33 formed on its rear face and positioned between the guideways 34 provided on the lever 27, upon opposite sides of the slot 30, thus preventing rotation of the head 32. The head is locked in adjusted position within the slot 30 by a nut 35 threaded upon the outer end of the shank 31.

Rotatably journaled within the shank 31 is a stud 36, which is provided at its outer end with a split bearing 37 for reception of the gauge finger 38. A threaded stud 39 passing through the ears 40 serves to contract the block 37 to lock the gauge finger 38 in adjusted position.

Inasmuch as it is essential that the bearing block be permitted to rotate in one direction with relation to the head 32, for the purpose to be hereinafter described, the stud 36 is loosely journaled within the shank 31, and the bearing block 37 is provided with a nib 41 disposed between the spaced lugs 42 carried by the head 32. One of the lugs is provided with a set screw 43 adapted to engage the nib 41 and limit rotation of the bearing block in one direction, while a spring 44, disposed between the nib and the opposite lug 42, opposes rotation of the block in the opposite direction. The stud 36 is retained in the shank 31 by a washer 45 locked or secured to the end of the same by a machine screw 46.

The lever 27 and the arm 29 are held against relative movement in one direction by a bolt 47, while an expansible spring 48 disposed between the two allows relative movement in the opposite direction, for the purpose to be hereinafter described. Rotation of the lever 27, to bring the gauge finger 38 into alinement with the stock, is accomplished by means of the stem 49, fastened to the plunger 50, mounted in the fluid cylinder 51, and connected with the pump P. A coil spring 52, disposed between the arm 29 and a bracket 43, carried by the cylinder 51, urges the arm 29 to its normal position upon release of the pressure fluid in the cylinder 51.

Starting mechanism

After the feeding and gauging operations are completed, operation of the machine tool is effected by the plunger 54, operable in the fluid cylinder 55, connected with the pump P, the plunger 54 being urged to its normal position by a spring 56. When the plunger 54 is projected, the same engages a trip 57, which effects the valve Q, and also operates a starting lever 58 connected with a clutching mechanism (not shown) on the machine tool, through the rod 59, thus making the successive operations performed upon the work entirely automatic, and at the same time preventing the manual starting of the machine tool until such time as the stock has been fed and clamped in proper position for a new operation.

Control valve

The control valve Q comprises a housing 60, in which a rotatable valve plug 61 is mounted. The housing 60 is provided with a supply inlet 62, communicating with a passage 63, common to the ports 64, 65, and 66. The opposite side of the housing is provided with separate ports 67, 68, and 69, while the valve plug is provided with a plurality of transverse ducts 70, 71, and 72, which provide selective communication between the various ports in the valve housing 60, as will be hereinafter described. The valve housing also has a common return passage 73 communicating with the ports 74, 75, and 76, and upon rotation of the valve plug 61 selective communication is provided through ducts 70, 71, and 72, with the ports 67, 68, and 69, to permit return of the pressure fluid to the pump P through the line 77.

Pressure fluid is supplied to the valve Q from the pump P through the line 78. The port 67 communicates with both the feed cylinder 15 and the gauge actuating cylinder 51 through the line 79. The port 68 is connected with the starting cylinder 55, through the line 80, while the port 69 connects with the vice or chucking cylinder 25 through the line 81. An arm 82, secured upon a stem 83 projecting from one end of the valve plug, effects rotation of the valve, as will be hereinafter described.

Valve actuating mechanism

As heretofore explained, the valve plug 61 is rotated upon actuation of the arm 82, which is shifted to its various operative positions by mechanisms affected by the saw frame S, the gauge G, and the starting mechanism H.

In the present instance, in which the invention is illustrated as applied to a power hacksaw, the saw frame 84, which has a vertical movement, carries a conventional saw head 85 to which the hacksaw 86 is connected, it being understood that the saw head has a horizontal reciprocative movement to carry the hacksaw through the work. The saw frame 84 is provided with a lug 87, from which a rod 88 is slidably supported, and a coil spring disposed between the lug 87 and nuts 89, threaded upon the upper end of the rod, permits relative movement between the rod and saw frame. The lower end of the rod 88 is secured to a slidable plate 90, upon which a latch 91 is pivotally mounted, and urged to its normal latching position by a spring 92.

Figure 2:
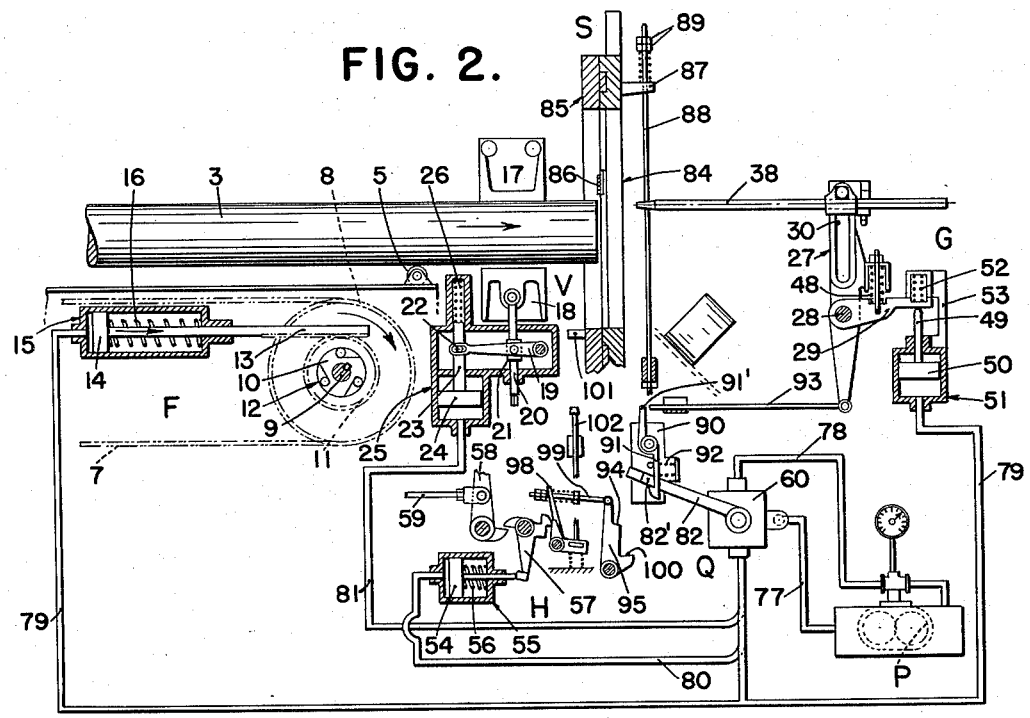
Figures 2 and 3 are similar views illustrating different positions of the working elements.

As best shown in Figure 2, after the saw has completed its cut, the same is raised to its uppermost position, which lifts the plate 90, the latch 91 having engaged the lug 82' on the arm 82, when the saw frame is dropped to its lowermost position upon completion of a cut. The arm 82 is held in the position shown in Figure 2 until such time as the stock is fed forward to engage the gauge finger 38, which rocks the lever 27 and projects the rod 93 to engage the tail 91', and kick off the latch 91, releasing the arm 82 and allowing the same to swing downwardly, until it engages the upper notch 94 provided on the pivotal dog 95. The valve remains in this position until the starting plunger 54 is actuated to rock the trip 57, which rotates the nose 57' out of the path of the lug 96 formed on the bell crank 97.

The vertical arm 98 of the bell crank 97 is connected with the dog 95 through the rod 99, thus causing the dog to be rotated sufficiently to release the valve arm 82 from the notch 94, and allow it to drop to the lower notch 100, as shown in Figure 1. When the saw completes its cut, and drops to its lowermost position, a lug 101, carried by the saw frame 84, engages the rod 102, connected to the lower arm of the bell crank 96 to rock the same and shift the dog 95 to the position shown in Figures 2 and 3, for supporting the arm 82 in the notch 94 after the arm is released from the latch 91. A spring disposed between the arm 98 of the bell crank 97, and a collar fast on the rod 99 allows a yield of the dog 95 to permit the valve arm 82 to be rotated upwardly past the notch 94 by the latch 91, when the plate 90 is raised by the saw frame upon its return to its uppermost position prior to taking a new cut.

Figure 3:
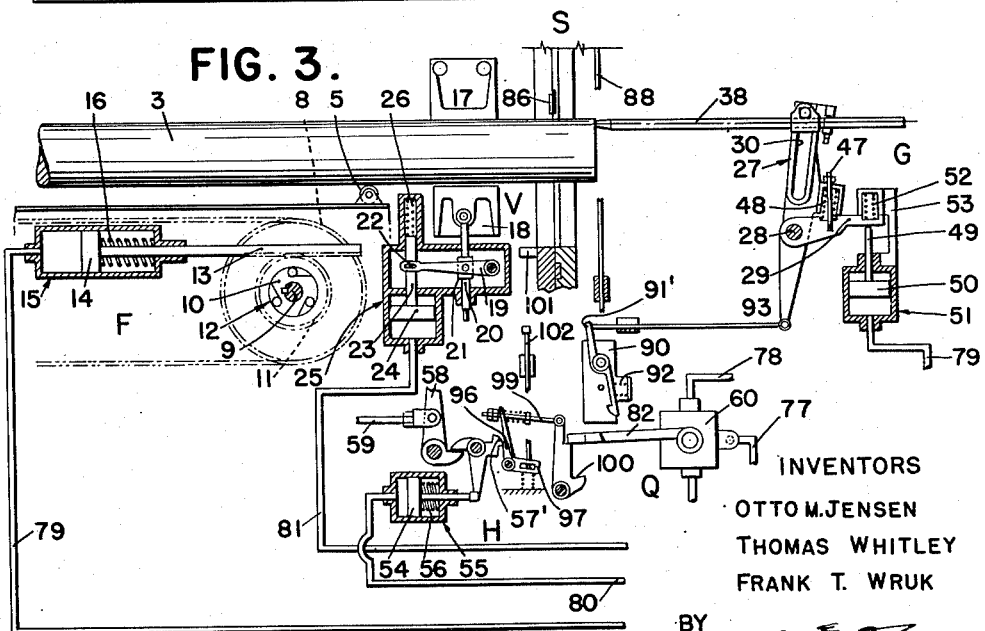

In the raised position of the plate 90, as shown in Figure 1, the rod 93 rests upon the tail 91' of the latch 91, until such time as the gauge lever 27 is rotated to the position shown in Figure 2, which causes the rod 93 to be withdrawn from the tail 91', and drop to the position shown to engage the tail upon return of the gauge lever 27 to its normal position, as shown in Figure 3.

Operation

Considering the operation of the invention, the relative positions of the various units and the operation of the valve will now be described in detail.

Cutting operation

Figure 5:
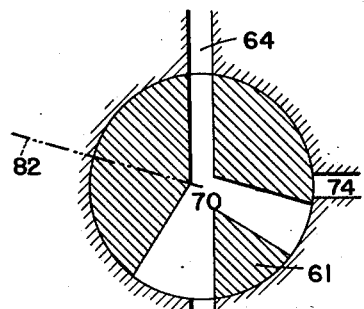
Figures 5, 5A and 5B are fragmentary, transverse sections taken on the line 5—5 of Figure 4, showing the relative position of one set of ports in the valve and valve casing in different operative positions.
Figure 5A:
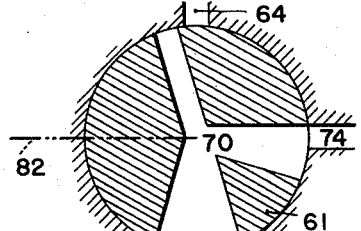
Figure 5B:
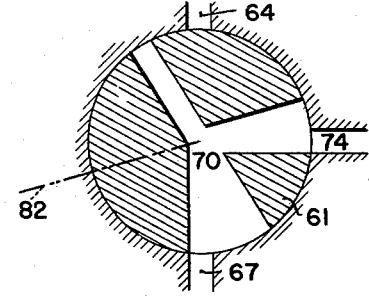

Figure 1 illustrates the position of the parts during the cutting operation of the machine tool, during which the ducts of the valve plug 61 are positioned as illustrated in Figures 5B, 6B, and 7B in which position the inlet 64 is closed, while communication is provided between the ports 67 and 74 through the duct 70 (Figure 5B) that allows the pressure fluid from the feed cylinder 15 and the gauge cylinder 51 to return to the pump through the lines 79 and 77, which renders the feeding mechanism F and the gauging device G inoperative. At the same time, the duct 71 has assumed the position illustrated in Figure 6B, in which the inlet port 65 is closed, and communication provided between the ports 68 and 75, through the duct 71, to relieve fluid pressure within the starting cylinder 55.

During the operation of the machine tool, it is essential that the stock 3 be chucked by the clamping mechanism V, and, therefore, the cylinder 25, which actuates the slidable clamping jaw 18, is opened to pressure fluid from the pump, a communication being provided between the inlet port 66 and the port 69, through the duct 72, while the return port 76 is closed, as best shown in Figure 7B.

Feeding operation

After the saw 86 has completed its cut, and the saw frame 84 reaches its lowermost position, the valve handle 82 is engaged by the pivotal latch 91 carried by the slidable plate 90, and upon automatic raising of the saw frame to its uppermost position, prior to taking a new cut, the rod 88 is picked up by the saw frame to raise the plate 90, and rotate the valve handle 82 upwardly to shift the ducts 71 and 72 to the position shown in Figures 5, 6, and 7. In the position of the parts illustrated in Figure 2, the apparatus is set to feed the stock 3 forwardly until it engages the gauge finger 38 for limiting the feeding action, as will be later described. During the feeding operation illustrated in Figure 2, the duct 70 in the valve plug provides a communication between the pressure fluid inlet port 64, and the port 67 (Figure 5) connected with both the feed cylinder 15 and the gauge cylinder 51. At the same time, the return port 74 is closed by the valve. Therefore, fluid pressure is admitted to both the feed cylinder 15 and the gauge cylinder 51, which causes the gauge finger to be rocked into alinement with the end of the stock, as shown in Figure 2, and the carriage 1 to travel forwardly in the direction of the arrow to feed the stock forwardly in the direction indicated by the arrow.

Due to the fact that the cylinder 50 is of less capacity than the feed cylinder 15, and the spring opposing plunger 50 has less tension than the spring opposing plunger 14, actuation of the plunger 50 to rock the gauge finger into operative position occurs, prior to the feeding operation.

Obviously, during the feeding operation (Figure 2) the clamping jaw 18 must release the stock, and, therefore, the inlet port 66 is cut off by the valve plug 61 (Figure 7), while a communication between the ports 69 and 75 is provided through the duct 72, which relieves the fluid pressure within the cylinder 25, and permits the spring 26 to cause withdrawal of the jaw 18 from clamping engagement with the stock. Also, during the feeding and gauging operations the starting cylinder 55, connected with the port 68, is in communication with the return port 73, through the duct 71, as shown in Figure 6.

Gauging operation

The length of feed of the stock 3 is determined by the gauging mechanism G, upon engagement of the end of the stock with the gauge finger 38, causing the lever 27 to be rocked rearwardly against the tension of the spring 48 disposed between said lever and the arm 29, (Figure 3), which shifts the rod 93 to engage and release the latch 91 from the lug 82' projecting from the valve arm 82, thus allowing the arm 82 to shift downwardly into engagement with the top notch 94 on the dog 95. Downward movement of arm 82 to notch 94 shifts the valve plug to the position illustrated in Figures 5A, 6A, and 7A, wherein the inlet port 64 in the valve casing is closed. The port 67 is then opened to communication with the return port 74, thus relieving fluid pressure within the feed cylinders 15 and the gauge cylinder 51, to allow their respective plungers to return to normal position. At the same time a communication is formed between the inlet port 66 and the port 69 through the duct 72, to admit pressure fluid to the cylinder 25, causing the shiftable jaw 18 to again clamp the stock 3.

It will be noted from Figure 3 that the gauge finger 38 is adjusted on the lever 27 to engage the end face of the stock adjacent its periphery, the advantage of which is to permit the finger to quickly clear the stock upon shifting of the lever 27 to its normal position. Also, pivotal action of the finger bearing block 37 with relation to the head 32 allows the gauge finger 38 to be forced rearwardly by the stock without shifting on the stock, which would occur in a rigid mounting of the finger because of the resultant arcuate movement.

Starting mechanism

At the same time the foregoing operation occurs, a communication is provided between the ports 65 and 68 through the duct 71 (Figure 6A) to supply fluid pressure to the starting cylinder 55, which, as heretofore explained, actuates the trip 57 to rotate the starting handle 58, initiating a new operation of the saw, and at the same time causing shifting of the bell crank lever 97, to rotate the dog 95, and allow the arm 82 to drop to its lower position, as shown in Figure 1, to relieve pressure in the cylinder 55.

Summary

From the foregoing explanation, considered in connection with the accompanying drawings, it will be seen that an exceedingly simple and positive apparatus has been provided for automatically effecting feeding of stock to a machine for successive operations at predetermined spaces on the stock, securely chucking the stock during the operation of the machine, and automatically initiating operation of the machine in synchronized relation to the feeding and clamping operations. Actuation of the working units is accomplished by means of fluid pressure cylinders controlled by a single valve operatively effected by both the work and the machine, which insures successive timed operation of the working units for automatic feeding, and performance on the stock by the machine. Due to the fact that fluid pressure cylinders are employed for actuating the working parts, the same may be of such capacity as to permit operation at minimum fluid pressure, which allows an exceedingly light construction, speedy operation, and a minimum number of working parts, with a resultant low cost in both manufacture and maintenance.

While it is preferred to utilize hydraulic pressure, it is to be understood that compressed air may be employed, and in referring to the machine tool throughout the specification and claims, it is contemplated that the same shall include all types of machines to which stock is to be automatically fed to the machine for successive operations.

Also, while that form of the invention illustrated is designed as an attachment for a conventional power hack saw, the operation of which is normally initiated through actuation of the control lever 58, it is to be understood that the invention may be incorporated directly in the design of various machines as a part thereof.

We claim:

1. An apparatus for automatically feeding stock to a machine tool for successive operations comprising, fluid pressure actuating means for intermittently feeding, gauging the length of feed, and chucking the stock during operation of the machine, fluid pressure actuated means for initiating operation of the machine tool upon completion of the chucking operation, a single valve for controlling the pressure fluid, and mechanism effected by the machine tool, the gauge, and said initiating means, for controlling operation of said valve.

2. An apparatus for automatically feeding stock to a machine tool for successive operations comprising, a carriage for receiving the stock, a fluid cylinder and ram for imparting intermittent movement to said carriage to feed the stock to said machine tool, a clamp for intermittently engaging and holding the stock adjacent the machine during operation of the same, a fluid cylinder and ram for actuating said clamp, a shiftable gauge member engaged by the work to determine the length of feed of the stock, a fluid cylinder and ram for shifting the gauge member to operative position, a fluid starting cylinder and ram for initiating operation of the machine tool, a valve for controlling the pressure fluid supplied to all of said cylinders, and mechanism effected by the machine tool, the gauge, and said starting cylinder, for controlling operation of said valve.

3. An apparatus for automatically feeding stock to a machine tool for successive operations comprising, fluid pressure actuated means for intermittently feeding stock to said machine, a fluid pressure actuated clamp for holding the work adjacent the machine tool during operation of the same, a shiftable fluid pressure actuated gauge for determining the length of feed of the stock upon engagement by the same, fluid pressure actuated means for initiating operation of said machine tool, a valve for controlling the pressure fluid, means carried by the machine for operating the valve to cause release of said clamp, shifting of the gauge to operative position, and feeding of the stock; means actuated by the gauge to cause operation of the valve upon engagement of the stock with said gauge to stop the feed, clamp the work, shift the gauge to inoperative position, and initiate operation of said machine tool; and a mechanism actuated by said initiating means to cause further movement of the valve and effect resetting of said initiating means.

4. An apparatus for automatically feeding stock to a machine tool for successive operations comprising, fluid pressure actuated means for intermittently feeding the stock to said machine, a fluid pressure actuated clamp for holding the work adjacent the machine tool during operation of the same, a shiftable fluid pressure actuated gauge for determining the length of feed of said stock, said gauge comprising an oscillating arm, a gauge finger adjustably and rotatably carried by said arm for engagement with the end of the stock, fluid pressure means for shifting said gauge finger to operative position, fluid pressure actuated means for initiating operation of said machine tool, and a valve for controlling the fluid pressure to all of said pressure-actuated elements.

OTTO M. JENSEN.
THOMAS WHITLEY.
FRANK T. WRUK.